(12) United States Patent
Jiang et al.

(10) Patent No.: US 11,757,713 B1
(45) Date of Patent: Sep. 12, 2023

(54) PLUG AND PLAY MECHANISM FOR ADDING NODES TO A HYPER-CONVERGED INFRASTRUCTURE (HCI) CLUSTER

(71) Applicant: Dell Products L.P., Round Rock, TX (US)

(72) Inventors: Rui Jiang, Shanghai (CN); Kui Hu, Shanghai (CN); Bruce Bin Hu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/969,504

(22) Filed: Oct. 19, 2022

(30) Foreign Application Priority Data

Sep. 29, 2022 (CN) .......................... 202211205139.0

(51) Int. Cl.
| | |
|---|---|
| H04L 29/06 | (2006.01) |
| H04L 29/08 | (2006.01) |
| H04L 41/0806 | (2022.01) |
| H04L 41/12 | (2022.01) |
| G06F 12/02 | (2006.01) |
| G06F 12/00 | (2006.01) |
| H04L 61/5007 | (2022.01) |
| H04L 61/4511 | (2022.01) |

(52) U.S. Cl.
CPC .......... *H04L 41/0809* (2013.01); *H04L 41/12* (2013.01); *H04L 61/4511* (2022.05); *H04L 61/5007* (2022.05)

(58) Field of Classification Search
USPC ........................................................ 709/220
See application file for complete search history.

(56) References Cited

U.S. PATENT DOCUMENTS

| | | | | |
|---|---|---|---|---|
| 7,194,263 | B2 * | 3/2007 | Bahl ..................... | H04W 88/06 455/426.2 |
| 7,248,570 | B2 * | 7/2007 | Bahl ..................... | H04W 16/14 370/254 |
| 2006/0069692 | A1 * | 3/2006 | Pernia ..................... | G06F 21/53 |
| 2011/0125979 | A1 * | 5/2011 | Kancharla ............. | G06F 9/5077 718/1 |
| 2014/0310389 | A1 * | 10/2014 | Lee ......................... | H04L 41/00 709/223 |
| 2014/0310796 | A1 * | 10/2014 | Lee ......................... | H04L 63/02 726/13 |

* cited by examiner

*Primary Examiner* — Jude Jean Gilles
(74) *Attorney, Agent, or Firm* — Jackson Walker L.L.P

(57) ABSTRACT

A disclosed plug and play method for expanding a cluster, comprised of a cluster manager and a plurality of existing and configured nodes connected to a Layer 2 discovery network detect a new node connecting to the cluster. The new node may be provisioned with a TCP/IP virtual adapter (TVA) configured to perform TVA operations. The TVA operations may include joining the Layer 2 discovery network and invoking an agent running in the new node to collect TVA stack information as well as broadcasting the TVA stack information to the Layer 2 discovery network. The operations further include, responsive to detecting TVA stack information on the Layer 2 discovery network by the new node, storing the TVA stack information to a node pool store and configuring the new node based, at least in part, on the TVA stack information and information in the node pool store corresponding to one or more of the configured nodes.

20 Claims, 4 Drawing Sheets

PLUG AND PLAY MECHANISM FOR ADDING NODES TO A HYPER-CONVERGED INFRASTRUCTURE (HCI) CLUSTER

TECHNICAL FIELD

The present disclosure relates to information handling systems and, more particularly, management of multi-node clusters of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyper-converged infrastructure (HCI) featuring virtualized and centrally managed compute, storage, and network resources. Commercially distributed examples of HCI-based products include the VxRail line of HCI appliances from Dell Technology. Such products may be deployed as an HCI cluster in which two or more HCI nodes are coupled and centrally managed by a management resource referred to herein as a cluster manager, wherein each HCI node may correspond to a physical HCI appliance or wherein two or more nodes may be encompassed within a single HCI appliance.

An important characteristic of HCI clusters is scalability, the ability to expand cluster capacity to accommodate increased workloads by adding additional nodes. Expanding an HCI cluster, i.e., adding one or more nodes to an existing cluster, may include manual interaction with a user interface (UI), after a new node is connected to an existing cluster, to trigger the cluster manager to perform node discovery. After the new node is discovered, an administrator may select the newly discovered node and populate it with various configurations. To illustrate by way of example, the administrator may configure the new node to include an association between the new node's physical adapters and ports of one or more virtual switches, e.g., virtual standard switch (vSS) and virtual distributed switch (vDS) from VMware. Additional examples may include, defining Layer 2 VLAN settings for the applicable cluster and Address/Gateway/fully-qualified-domain-name (FQDN) settings. The node expansion process may further include some form of validating a newly added node, applying a desired configuration to the node to enable the node to join the existing cluster, and providing wiring information indicating which rack/switch/switch-ports the new node is connected to after node installation is done, so that the person in charge of the cluster scalability can choose the suitable configuration for the new node and perform the manual steps to set up the new node to join the cluster. It would be desirable to implement a node expansion approach that reduced or eliminated communications and manual operations after the node is connected to the network.

SUMMARY

Common problems associated with traditional cluster expansion procedures as described above are addressed by disclosed systems and methods. In one aspect, a disclosed plug and play method for expanding a cluster, comprised of a cluster manager and a plurality of existing and configured nodes connected to a Layer 2 discovery network. In at least one embodiment, each of the configured nodes and the new node comprise hyper-converged infrastructure (HCI) nodes configured to provide virtualized compute, storage, and network resources managed by the cluster manager and wherein the cluster manager comprises an HCI manager configured to provide centralized management to one or more HCI nodes.

Disclosed plug and play methods begin by detecting a new node connecting to the cluster. The new node may be provisioned with a TCP/IP virtual adapter (TVA) configured to perform TVA operations. The TVA operations may include joining the Layer 2 discovery network and invoking an agent running in the new node to collect TVA stack information as well as broadcasting the TVA stack information to the Layer 2 discovery network. The plug and play operations further include, responsive to detecting TVA stack information on the Layer 2 discovery network by the new node, storing the TVA stack information to a node pool store and configuring the new node based, at least in part, on the TVA stack information and information in the node pool store corresponding to one or more of the configured nodes.

In at least one embodiment, configuring the node includes determining an available address/name mapping setting for the new node based, at least in part, on node information for the configured nodes and assigning at least one physical adapter to the new node based, at least in part, on the node information for the configured nodes. In some embodiments, determining an available address/name mapping setting for the new node includes checking the cluster for a conflicting IP address via an Internet Protocol v.4 (IPv4) ping, Internet Protocol v.6 (IPv6) duplicate address detection, or both. Determining the available address/name mapping setting for the new node may also include checking for a conflicting domain name using a reverse domain name server (DNS) lookup.

The plug and play operations may perform additional configuring of the new node. As a non-limiting example, the plug and play operations may include associating at least one physical adapter with one or more virtual switch ports based on configuration information for at least one of the configured nodes. The one or more virtual switch ports may include at least one virtual switch port for management services. The plug and play operations may still further include performing network file system (NFS) configuration for the new node based on NFS configuration for at least one of the configured nodes. In such embodiment, performing the NFS configuration may include configuring the new node to connect to an NFS server address indicated in configuration for the at least one configured node, i.e., the new node and the configured node connect to the same NFS server.

Some embodiments may provision the cluster with a redundant physical adapter and the plug and play operations may include operations for responding to detecting a failed state or other state change for an existing physical adapter of the cluster, by assigning the redundant physical adapter for each of one or more nodes assigned to the existing physical adapter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
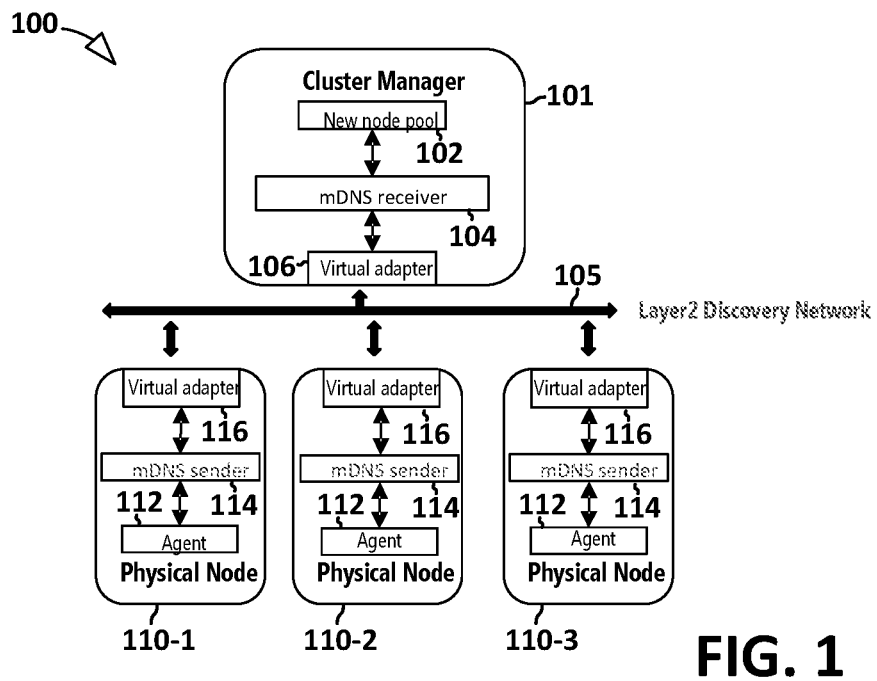
FIG. 1 illustrates an exemplary multi-node cluster in accordance with disclosed teachings.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary HCI cluster platform 100 suitable for use in conjunction with disclosed features for plug and play expansion of a multi-node, HCI cluster. The HCI cluster platform 100 of FIG. 1 includes an HCI-based cluster manager referred to herein simply as cluster manager 101, a plurality of physical nodes 110, of which FIG. 1 illustrates the physical nodes 110-1, 110-2, and 110-3. The illustrated HCI cluster platform 100 further includes a Layer 2 discovery network 105 connected to TCP/IP virtual adapters (TVAs) 116 in each of the physical nodes 110 and to a virtual adapter 106 of cluster manager 101. Each of the illustrated physical nodes 110 includes, in addition to its TVA 116, a multicast DNS (mDNS) sender 114, and a plug and play agent referred to herein simply as agent 112, all of which are described in more detail below.

To support plug and play expansion of multi-node clusters, the physical nodes 110 illustrated in FIG. 1 are provisioned with TVAs 116 configured to join Layer 2 discovery network 105 by default. Similarly, the virtual adapter 106 of the cluster manager 101 is illustrated provisioned with a virtual adapter 106 configured to cause cluster manager to join Layer 2 discovery network 105 by default.

The agent 112 on each physical node 110 may be configured to collect a cluster inventory and TCP/IP stack information including, without limitation, serial number information, information indicating the status of physical adapters (not physically illustrated in FIG. 1) and a link local address of the node's TVA 116. In at least one embodiment, when a new node is connected to the cluster, TVA 116 may be configured with a default configuration that enables and/or causes the TVA, when connected to the cluster, to join Layer 2 discovery network 105. Each of the agents 112 may be configured to collect the inventory and virtual adapter stack information and broadcast information over the Layer 2 discovery network 105 using a multi cast DNS service. The cluster manager 101 may be configured to listen on its mDNS ports and to include an mDNS receiver 104 to code mDNS information received from a new node via the virtual adapter. The cluster manager 101 may save the information to node pool store 102.

Figure 2:
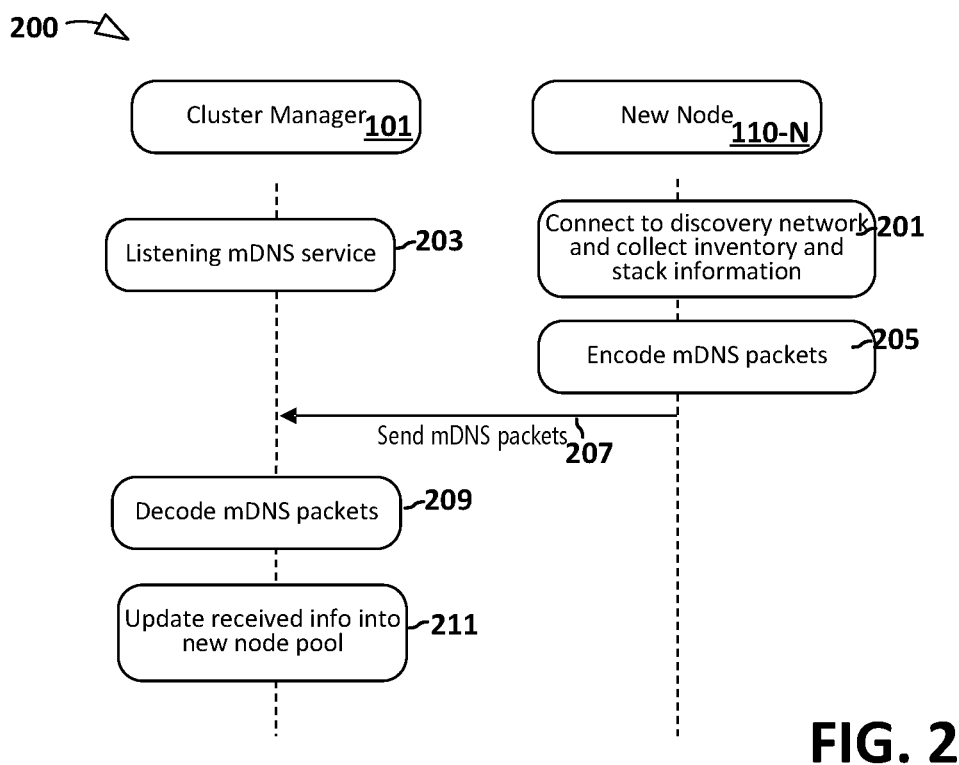
FIG. 2 illustrates exemplary discovery operations supported by the cluster of FIG. 1.

FIG. 2 illustrates exemplary plug and play discovery operations 200 involving cluster manager 101 and new node 110-N added to the existing multi-node cluster. When new node 110-N is connected to the existing cluster, the new node may be pre-configured to connect to the Layer 2 discovery network 105 discussed above with respect to FIG. 1 and to collect (operation 201) inventory and virtual adapter stack information when the new node is connected. The illustrated discovery operations 200 include new node 110-N encoding (operation 205) mDNS packets and sending the mDNS packets (operation 207). Cluster manager 101 is illustrated with an mDNS receiver 104 or another suitable service for listening (operation 203) on the Layer 2 discovery network. The mDNS listening service will detect the mDNS packets sent by new node 110-N; in response, cluster manager 101 will decode mDNS packets (operation 209) and update the received information into the node pool store (operation 211).

Figure 3:
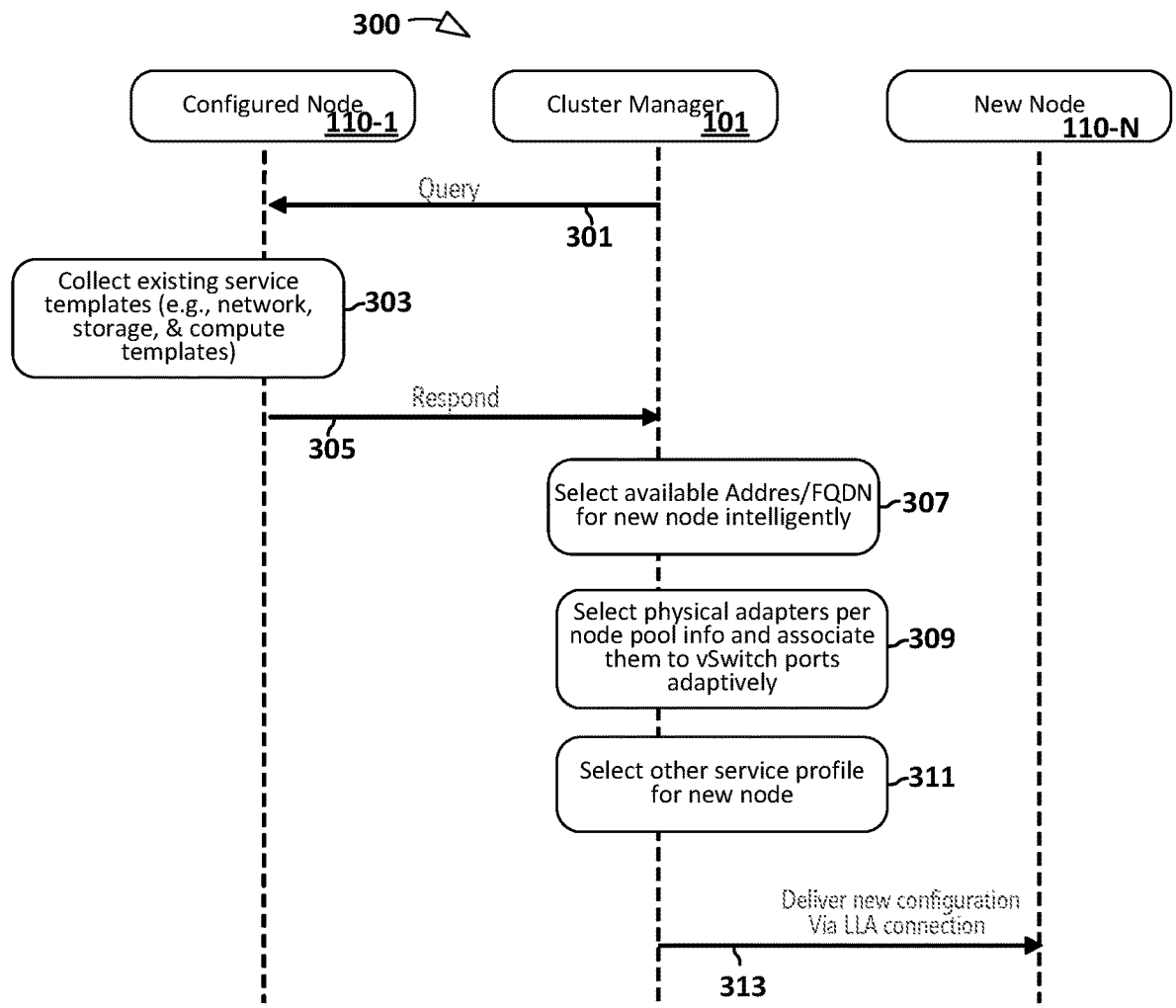
FIG. 3 illustrates exemplary configuration operations supported by the cluster of FIG. 1.

FIG. 3 illustrates exemplary plug and play configuration operations 300 involving cluster manager 101, new node 110-N, and a configured node 110-1. As depicted in FIG. 3, cluster manager 101 issues (operation 301) a query to one of the configured nodes 110-1. The configured node 110-1 responds to the query by collecting (operation 303) existing service templates including, as examples, network storage templates, computer templates, etc. The configured node 110-1 may then respond (operation 305) by returning the existing service information to cluster manager 101. In response to receiving the collected information from configured node 110-1, cluster manager 101 may select (operation 307) an available address/domain name for the new node. The selection of an available IP address/domain name for the new node may be performed intelligently. For example, the cluster manager 101 may check the selected IP address for a conflict within the multi-node cluster using a ping or duplicate address detection mechanism of the applicable customer. The cluster manager 101 may further configure the new node by selecting (operation 309) physical adapters based on information in the node pool store and associate each physical adapter to a virtual switch port adapter. After configuring any other service profiles for the new node at operation 311, cluster manager 101 sends (operation 313) new configuration information to new node 110-N via a local link address connection.

Figure 4:
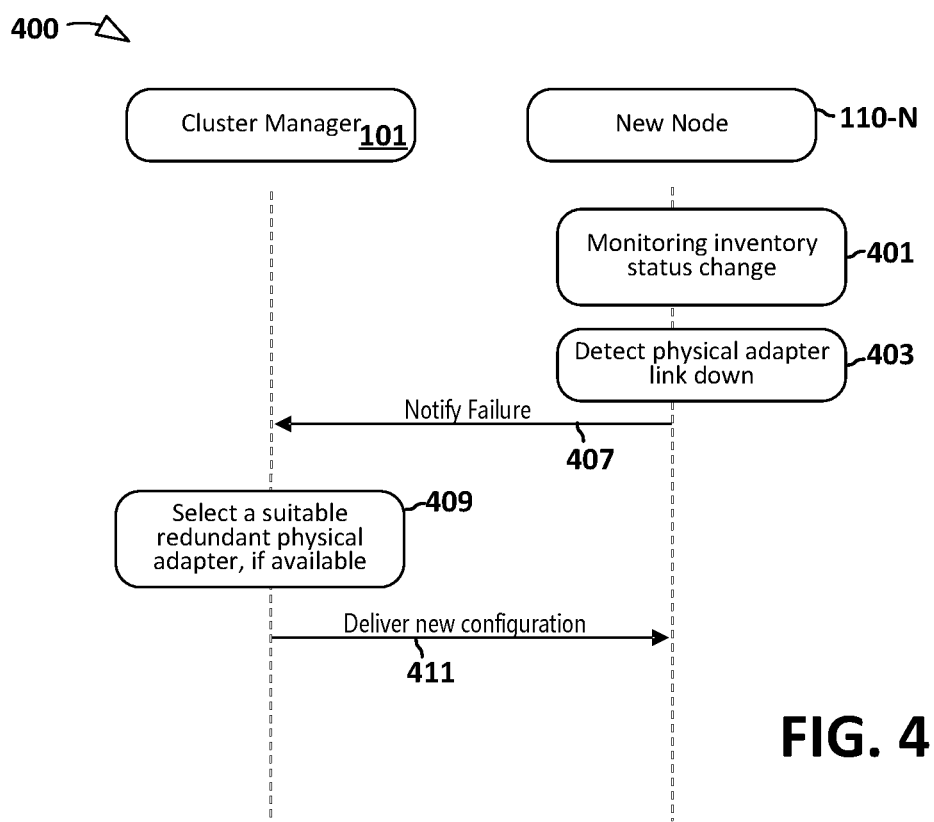
FIG. 4 illustrates exemplary failure detecting and recovery operations supported by the cluster of FIG. 1.

Turning now to FIG. 4, exemplary fault detection and recovery operations 400 suitable for use in conjunction with the multi-node cluster in accordance with disclosed teachings includes new node 110-N monitoring (operation 401) for inventory status changes. At operation 403, new node 110-N detects a physical adapter link failure and responds by sending a failure notification (operation 407) to cluster manager 101. Cluster manager 101 then, at operation 409, select a suitable redundant physical adapter if such redundant adapter is available, and delivers (operation 411) the new configuration to new node 110-N. In this manner, the illustrated detection and recovery operations 400 automatically respond when a physical adapter failure occurs and automatically provide the cluster node with a new physical node configuration. Although FIG. 4 illustrates operations 400 in conjunction with new node 110-N, it will be appreciated that the cluster manager 101 may deliver new physical adapter configuration for existing nodes as well as new nodes.

Figure 5:
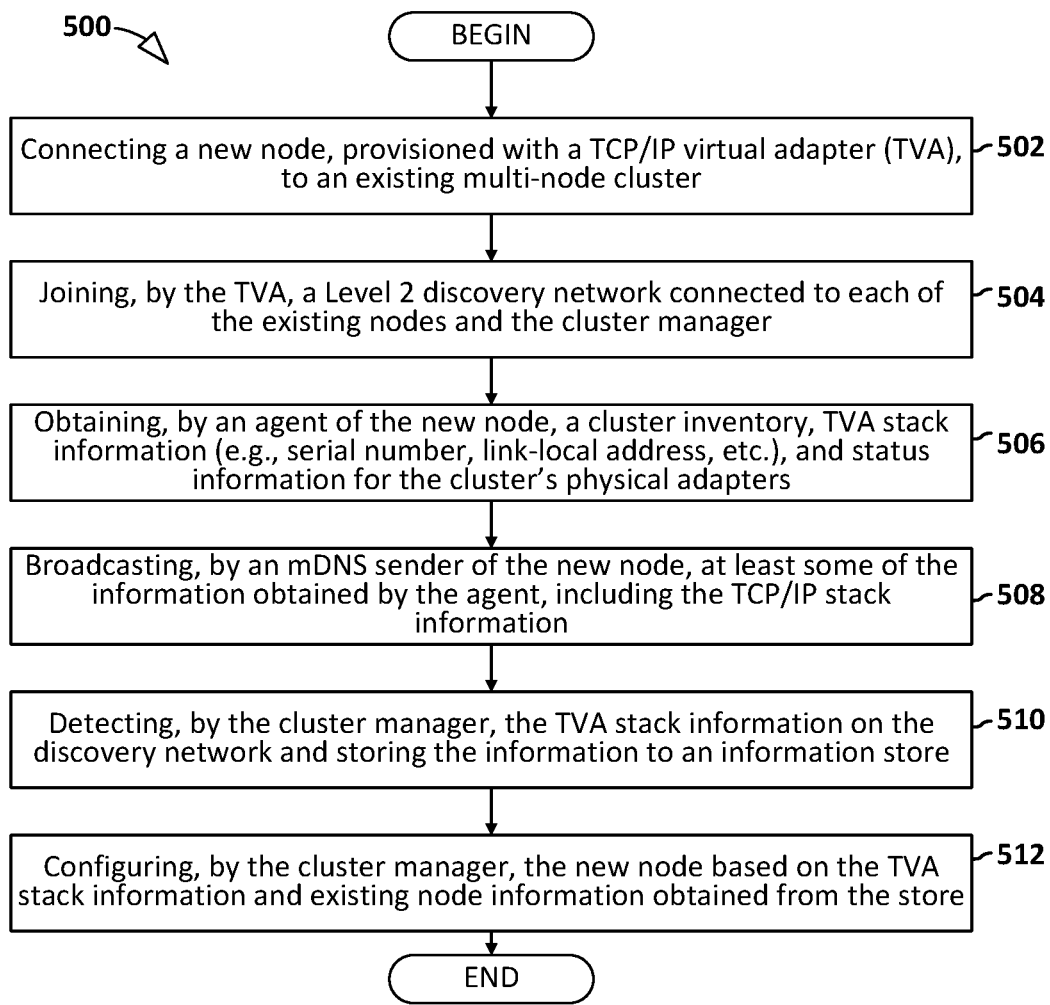
FIG. 5 is a flow diagram illustrating a plug and play method for expanding a multi-node cluster in accordance with disclosed teachings.

Referring now to FIG. 5, a flow diagram illustrates an exemplary plug and play method 500 for expanding a multi-node cluster in accordance with disclosed teachings. The method 500 illustrated in FIG. 5 begins when a new node is connected (operation 502) to an existing multi-node cluster. As disclosed previously, the new node may be provisioned with a TCP/IP virtual adapter (TVA) with a default configuration that enables and/or causes the TVA, when connected to the cluster, to join (operation 504) a Layer 2 discovery network to which the cluster manager and each of the existing cluster nodes are connected. An agent of the new node may be configured to obtain (operation 506) a cluster inventory, indicating some or all of the existing cluster nodes, TVA stack information including, without limitation, a serial number and link-local address (LLA) of the TVA, and status information for one or more of the cluster's physical adapters. An mDNS sender of the new node may multi-cast or otherwise broadcast (operation 508) the TVA stack information over the Layer 2 discovery network.

Responsive to detecting TVA stack information broadcast over the Layer 2 discovery network by the new node, the cluster manager may then store (operation 510) the TVA stack information to a node pool store. The cluster manager may then configure (operation 512) the new node based, at least in part, on the TVA stack information and information, in the node pool store, corresponding to one or more of the configured nodes.

In some embodiments, the cluster manager may perform the configuration of the new node through an IPv6 LLA connection from the cluster manager to the new node on the Layer 2 discovery network. The cluster manager may select an available IP address/domain name mapping setting for the new node based on existing settings for the configured nodes. The cluster manager may check for IP address conflicts via an IPv4 ping, an IPv6 duplicate address detection, or both. To check the domain name availability, the cluster manager may use a DNS reverse lookup according to the DNS configuration on a configured node.

The cluster manager may select one or more suitable physical adapters for the new node in accordance with information in the node pool store. The cluster manager may also associate the selected physical adapter(s) with special virtual-switch ports including, as an illustrative example, a vSwitch from VMware to segregate network traffic and management traffic, in accordance with the configuration of the configured node.

The cluster manager may also perform additional service configuration automatically, including, as an example, configuration of the new node's network file system (NFS) features such as NFS storage for the new node. The cluster manager may configure the new node to connect to the same NFS server address used by one or more of the configured nodes in the cluster.

In some embodiments, the cluster manager can detect state changes including physical adapter state changes indicating, for example, a fault or failure for a physical node of the cluster. Some embodiments may provision the cluster with one or more redundant or spare physical adapters and, should an existing adapter fail, the cluster manager may reassign services to the redundant adapter to recover the service automatically and with minimal delay. In at least one embodiment, the cluster manager, in conjunction with an automated network configuration tool such as SmartFabric Services from Dell Technologies, may also be able to configure the clusters switches.

Figure 6:
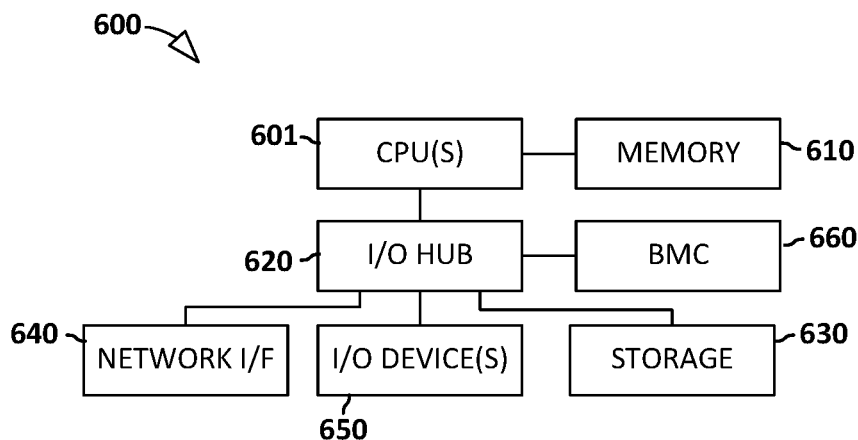
FIG. 6 illustrates an exemplary information handling system suitable for use in conjunction with features and functions of FIG. 1 through FIG. 5.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A plug and play method for expanding a cluster comprised of a cluster manager and a plurality of configured nodes connected to a Layer 2 discovery network, the method comprising:
   detecting a new node connecting to the cluster, wherein the new node is provisioned with a TCP/IP virtual adapter (TVA) configured to perform TVA operations including:
      joining the Layer 2 discovery network; and
      invoking an agent to:
         collect TVA stack information; and
         broadcast the TVA stack information to the Layer 2 discovery network;
   responsive to detecting TVA stack information broadcast over the Layer 2 discovery network by the new node, storing the TVA stack information to a node pool store; and
   configuring the new node based, at least in part, on the TVA stack information and information in the node pool store corresponding to one or more of the configured nodes.

2. The method of claim 1, wherein configuring the node includes:
   determining an available address/name mapping setting for the new node based, at least in part, on node information for the configured nodes; and
   assigning at least one physical adapter to the new node based, at least in part, on the node information for the configured nodes.

3. The method of claim 2, wherein determining an available address/name mapping setting for the new node includes checking for a conflicting IP address with at least one of:
   an Internet Protocol v.4 (IPv4) ping; and
   an Internet Protocol v.6 (IPv6) duplicate address detection.

4. The method of claim 2, wherein determining an available address/name mapping setting for the new node includes checking for a conflicting domain name using a reverse domain name server (DNS) lookup.

5. The method of claim 2, further comprising:
   associating the at least one physical adapter with one or more virtual switch ports based on configuration information for at least one of the configured nodes, wherein the one or more virtual switch ports include at least one virtual switch port for management services.

6. The method of claim 1, further comprising:
performing network file system (NFS) configuration for the new node based on NFS configuration for at least one of the configured nodes.

7. The method of claim 6, wherein performing the NFS configuration includes configuring the new node to connect to an NFS server address indicated in configuration for the at least one configured node.

8. The method of claim 1, further comprising:
provisioning the Layer 2 discovery network with a redundant physical adapter; and
responsive to detecting a state change for an existing physical adapter of the cluster, assigning the redundant physical adapter for each of one or more nodes assigned to the existing physical adapter.

9. The method of claim 1, wherein the TVA stack information includes A serial number of the TVA and a link-local address of the TVA.

10. The method of claim 1, wherein each of the plurality of nodes and the new node comprise hyper-converged infrastructure (HCI) nodes configured to provide virtualized compute, storage, and network resources managed by the cluster manager and wherein the cluster manager comprises an HCI cluster manager configured to provide centralized management to one or more HCI nodes.

11. An information handling system comprising:
a central processing unit (CPU); and
a computer readable memory including executable instructions that, when executed by the CPU, cause the system to perform plug and play operations for expanding a cluster comprised of a cluster manager and a plurality of configured nodes connected to a Layer 2 discovery network, the plug and play operations comprising:
detecting a new node connecting to the cluster, wherein the new node is provisioned with a TCP/IP virtual adapter (TVA) configured to perform TVA operations including:
joining the Layer 2 discovery network; and
invoking an agent to:
collect TVA stack information; and
broadcast the TVA stack information to the Layer 2 discovery network;
responsive to detecting TVA stack information broadcast over the Layer 2 discovery network by the new node, storing the TVA stack information to a node pool store; and
configuring the new node based, at least in part, on the TVA stack information and information in the node pool store corresponding to one or more of the configured nodes.

12. The information handling system of claim 11, wherein configuring the node includes:
determining an available address/name mapping setting for the new node based, at least in part, on node information for the configured nodes; and
assigning at least one physical adapter to the new node based, at least in part, on the node information for the configured nodes.

13. The information handling system of claim 12, wherein determining an available address/name mapping setting for the new node includes checking for a conflicting IP address with at least one of:
an Internet Protocol v.4 (IPv4) ping; and
an Internet Protocol v.6 (IPv6) duplicate address detection.

14. The information handling system of claim 12, wherein determining an available address/name mapping setting for the new node includes checking for a conflicting domain name using a reverse domain name server (DNS) lookup.

15. The information handling system of claim 12, wherein the plug and play operations include:
associating the at least one physical adapter with one or more virtual switch ports based on configuration information for at least one of the configured nodes, wherein the one or more virtual switch ports include at least one virtual switch port for management services.

16. The information handling system of claim 11, wherein the plug and play operations include:
performing network file system (NFS) configuration for the new node based on NFS configuration for at least one of the configured nodes.

17. The information handling system of claim 16, wherein performing the NFS configuration includes configuring the new node to connect to an NFS server address indicated in configuration for the at least one configured node.

18. The information handling system of claim 11, wherein the plug and play operations include:
provisioning the Layer 2 discovery network with a redundant physical adapter; and
responsive to detecting a state change for an existing physical adapter of the cluster, assigning the redundant physical adapter for each of one or more nodes assigned to the existing physical adapter.

19. The information handling system of claim 11, wherein the TVA stack information includes A serial number of the TVA and a link-local address of the TVA.

20. The information handling system of claim 11, wherein each of the plurality of nodes and the new node comprise hyper-converged infrastructure (HCI) nodes configured to provide virtualized compute, storage, and network resources managed by the cluster manager and wherein the cluster manager comprises an HCI manager configured to provide centralized management to one or more HCI nodes.

* * * * *